United States Patent
Marple et al.

(10) Patent No.: US 9,099,741 B2
(45) Date of Patent: Aug. 4, 2015

(54) PARTICLE SIZE DISTRIBUTION VARIATIONS IN IRON DISULFIDE CATHODES

(75) Inventors: Jack W. Marple, Avon, OH (US); Michael W. Wemple, Westlake, OH (US); Ronald Crawford, Westlake, OH (US); Weiwei Huang, Westlake, OH (US); George L. Schimek, Seven Hills, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 112 days.

(21) Appl. No.: 13/534,645

(22) Filed: Jun. 27, 2012

(65) Prior Publication Data

US 2013/0004848 A1 Jan. 3, 2013

Related U.S. Application Data

(60) Provisional application No. 61/503,627, filed on Jul. 1, 2011.

(51) Int. Cl.
| | |
|---|---|
| *H01M 4/58* | (2010.01) |
| *H01M 4/04* | (2006.01) |
| *B82Y 30/00* | (2011.01) |
| *H01M 4/52* | (2010.01) |
| *C01G 49/12* | (2006.01) |
| *H01M 4/136* | (2010.01) |
| *H01M 4/1397* | (2010.01) |
| *H01M 6/16* | (2006.01) |

(52) U.S. Cl.
CPC ............ *H01M 4/5815* (2013.01); *C01G 49/12* (2013.01); *H01M 4/136* (2013.01); *H01M 4/1397* (2013.01); *H01M 4/52* (2013.01); *H01M 4/523* (2013.01); *H01M 4/58* (2013.01); *H01M 6/16* (2013.01); *C01P 2004/51* (2013.01); *C01P 2006/40* (2013.01); *Y02E 60/122* (2013.01)

(58) Field of Classification Search
CPC ......... H01M 4/52; H01M 4/523; H01M 4/58; H01M 4/5815
USPC ........ 429/400–535, 158, 221, 126.1; 977/773
See application file for complete search history.

(56) References Cited

U.S. PATENT DOCUMENTS

| | | |
|---|---|---|
| 5,290,414 A | 3/1994 | Marple |
| 5,514,491 A | 5/1996 | Webber |
| RE41,886 E | 10/2010 | Marple |

(Continued)

OTHER PUBLICATIONS

Strauss et al. "Lithium Polymer Electrolyte Pyrite Rechargeable Battery: Comparative Characterization of Natural Pyrite From Different Sources as Cathode Material." Journal of Power Sources 88 (2000) 206-218.*

(Continued)

*Primary Examiner* — Milton I Cano
*Assistant Examiner* — Michael Dignan
(74) *Attorney, Agent, or Firm* — Eveready Battery Company, Inc.

(57) ABSTRACT

A cathode, electrochemical cell and process for making either is disclosed. The cathode includes iron disulfide which exhibits multiple peaks representing distinct maxima of mean diameters for the volume-based particle size distribution. All of the maxima are less than 20 microns. A combination of natural pyrite ore and synthetic iron disulfide may be mixed to achieve the desired distribution, or a combination of natural pyrite ores may be processed in different manners to achieve the desired characteristics.

10 Claims, 3 Drawing Sheets

(56) References Cited

U.S. PATENT DOCUMENTS

| | | |
|---|---|---|
| 7,923,138 B2 | 4/2011 | Wu et al. |
| 2009/0104520 A1 | 4/2009 | Marple |
| 2010/0151303 A1* | 6/2010 | Marple et al. ............... 429/94 |
| 2010/0221588 A1 | 9/2010 | Marple |
| 2010/0273036 A1 | 10/2010 | Marple et al. |
| 2010/0303711 A1 | 12/2010 | Schimek et al. |
| 2011/0086254 A1 | 4/2011 | Huang |

OTHER PUBLICATIONS

In-Shup Ahn et al. "The Effects of the Particle Size and Active Materials on the Discharge Properties of the Li/Fe(X)S2 Electrode." Metals and Materials International, vol. 14, No. 1 (2008) 65-70.*

Pensler et al. "Discharge Behavior and thermal stability of Synthetic FeS2 Cathode Material." J. Electrochem. Soc. 137 (1990) 1-7.*

Pandolfo et al. "Carbon properties and their role in supercapacitors." Journal of Power Sources 157 (2006) 11-27.*

Choi, J.W. et al.: "Electrochemical characteristics of room temperature Li/Fes2 batteries with natural pyrite cathode", Journal of Power Sources, Elsevier SA, CH. vol. 163, No. 1, Dec. 7, 2006, pp. 158-165.

Shao-Horn, Y, et al.: "Chemical, structural and electrochemical comparison of natural and synthetic FeS2 pyrite in Lithium Cells", Electrochimica Acta, Elseview Science Publishers, Barking, GB. vol. 46, No. 17, May 15, 2001, pp. 2613-2621.

Patent Cooperation Treaty (PCT), International Search Report and Written Opinion for Application No. PCT/US2012/044361, filed Jun. 27, 2012, mailed Sep. 6, 2012, European Patent Office, Netherlands.

Iwakura, et al. "Preparation of Iron Disulfide and Its Use for Lithium Batteries", Electrochimica Acta, vol. 28, No. 3 (1983), pp. 269-275.

Shao-Horn, et al. "Chemical, structural and electrochemical comparison of natural and synthetic FeS2, pyrite in Lithium Cells", Electrochemica Acta, vol. 46 (2001), pp. 2613-2621.

Shao-Horn, et al. "Nano-FeS2 for Commercial Li/FeS2 Primary Batteries", Journal of the Electrochemical Society, vol. 149 (2002), pp. A1499-A1502.

* cited by examiner

PARTICLE SIZE DISTRIBUTION VARIATIONS IN IRON DISULFIDE CATHODES

CROSS REFERENCE TO RELATED APPLICATIONS

This application claims the benefit of U.S. Provisional Application No. 61/503,627, filed on Jul. 1, 2011.

FIELD OF THE INVENTION

The present invention contemplates the use of an iron-disulfide containing cathode material, wherein the iron disulfide exhibits a plurality of modes or peaks in a plot of the volume distribution all the iron disulfide particles present in the cathode. In a preferred embodiment, a bimodal distribution is contemplated, with one mode associated with a synthetic pyrite source and the second mode associated a natural pyrite source.

BACKGROUND OF THE INVENTION

Lithium batteries (i.e., batteries containing metallic lithium or a metallic lithium alloy as sole electrochemically active negative electrode material) are becoming increasingly popular as portable power sources for electronic devices having high power operating requirements. Among these lithium batteries, lithium-iron disulfide (i.e., batteries utilizing iron disulfide as the primary electrochemically active positive electrode material) batteries are the most widely used and prevalent 1.5 volt consumer battery sizes (i.e., AA and AAA).

Lithium-iron disulfide batteries are usually made from pyrite, a naturally-occurring ore that contains mostly iron disulfide (preferably, in excess of about 90 wt. % and more preferably at or above about 95 wt. %). The natural ore is crushed, heat treated, and dry milled (e.g., jet milled) to a mean diameter of the volume distribution that is between 20 to 30 microns. In this approach, the fineness of the grind is limited by relatively hardness of the mineral and the reactivity of the particles with air and moisture. As the particle size is reduced, the surface area increases and becomes more susceptible to weathering, which is an unwanted oxidation in the presence of moisture and/or air to create iron sulfates. In turn, sulfates may increase acidity and reduce electrochemical activity of the pyrite and, by extension, the final cathode material. Iron disulfide particles under this approach can have particles sizes that are close to the final cathode coating thickness of about 80 microns because of inconsistencies in the dry milling process, and large particle sizes can negatively impact processes such as compaction/calendaring (causing substrate distortion), coating to substrate bond disruption and separator damage.

Under an improved manufacturing approach, the pyrite particles from natural ore may be milled in situ within the coating slurry through the use of a media mill. This approach can yield much smaller particle sizes and avoids the weathering issue, but the in situ nature of the media milling restricts the manufacturer to a single particle size profile based upon the resident time in which the slurry is subjected to milling. Stated differently, in a media milling operation, it is difficult to tailor the shape of the particle distribution produced by the milling, which is usually expected to be fairly uniform.

Pyrite particles derived from natural ores also contain a number of impurities. In particular, natural pyrite typically contains metal-based impurities containing metals such as Si, Mn, Al, Ca, Cu, Zn, As, and Co. Impurities are believed to decrease theoretical capacity input and contribute to problems such as shorting and/or other problems. The total concentration of various impurities in natural pyrite ore varies based upon mining and storage conditions, although they are often at least about 3 wt. % of the overall material. Notably, although pyrite and iron disulfide may be used interchangeably herein, a portion of that material may include non-electrochemically active constituents depending upon the context, and any reference to purity of pyrite or iron disulfide should be understood and interpreted accordingly.

Synthetic pyrite is also available as a potential raw material. Owing to the synthesis process, these materials can be substantially more expense than natural ore and the mean diameter of the volume distribution for synthetic pyrite typically has an average particle size anywhere from tens of nanometers up to about 2 microns. While synthetic pyrite can be produced with little or no metal-based impurities as found in natural pyrite, some synthetic pyrites may contain iron sulfides having forms other than $FeS_2$. For example, some types of synthetic pyrite may also contain iron sulfide (FeS), marcasite (a distinct and less preferred form iron disulfide) and/or lesser order iron sulfides such as pyrrhotite ($FeS_{1.3}$), all of which may have unwanted and/or unpredictable effects upon the electrochemical performance of synthetic pyrite. Additionally, synthetic pyrite has been observed to undergo greater volumetric expansion upon discharge as compared to natural pyrite. Finally, synthetic pyrite present challenges owing to the pyrophoric nature of extremely small particles.

The discharge reaction between lithium and iron disulfide is unique in comparison to the class of cathode compounds normally considered as candidates for primary lithium batteries. First, as iron disulfide discharges, the commonly accepted lithium-iron disulfide electrochemical reaction is expressed as $4\,Li+FeS_2 \rightarrow 2\,Li_2S+Fe$. However, the inventors have determined the proposed reaction mechanism involves at least two distinct reactions, including and the formation of an intermediate phase that ultimately concludes with a complete displacement reaction:

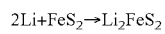
$$2Li+FeS_2 \rightarrow Li_2FeS_2$$

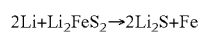
$$2Li+Li_2FeS_2 \rightarrow 2Li_2S+Fe$$

Second, iron disulfide cathodes undergo significant volumetric expansion during discharge in comparison to other cathode materials. In fact, as described in United States Patent Publication 2009/0104520 (incorporated by reference), iron disulfide cells and cathode coatings both must have sufficient amounts of void engineered into the cell design in order to avoid physically compromising the battery container. United States Patent Publication 2010/0273036 (also incorporated by reference) goes on to further suggest that even when the container has sufficient strength and the cell/cathode design has sufficient void, the expansion experienced by the cathode is non-uniform and causes deformation in parts of the coated iron disulfide cathode that can lead to physical penetration of the separator layer adjacent to the cathode.

One reason for the non-uniformity of expansion may relate to the fact that, unlike other electrode materials, the shape and morphology of pyrite varies from particle to particle and is not consistent. Depending upon the source (natural ore vs. synthetic) and the conditions under which the material was extracted and stored, pyrite may have a smooth or rough morphology, or a mixture of both. Moreover, the shape of the particles is rarely ever spherical and instead encompasses any number of polygonal cross-sectional shapes.

In the past, only a single pyrite source having a consistent composition was used, in part to avoid discontinuities in expansion upon discharge, difficulties with rheology/mix processing and/or unwanted variability in performance of the pyrite as a cathode material.

SUMMARY OF THE INVENTION

Based upon the foregoing observations, the inventors have discovered that the electrochemical performance, as well as the manufacturing processability of pyrite-based cathode slurries, can be optimized through the careful selection of a bimodal or multi-modal particle size distribution of the pyrite. In particular, a plurality of separate pyrite sources, each having a distinct particle size distribution, is contemplated. The particle size distributions of each pyrite source can be selected to complement one another, for example, by having a first source with smaller mean diameter of the volume distribution that is selected to fill any interstices created by a second source having a larger mean diameter (again based upon the volume distribution). Additionally or alternatively, the sources may be selected to strike a balance between the superior high-rate performance afforded by relatively small particle sizes and the reduced risk of unwanted weathering or other degradation inherent to larger pyrite particles. Mixing of pyrite sources of different types, and particularly of different particle sizes (as determined by the mean diameter of the volume distribution for each individual source), might also allow for the creation of active material having a specific surface area, less void within the coating, less compaction required of that coating, better particle-to-particle contact and improved conductivity in the coating and/or a reduction in stress forces between the coating and the collector. A combined use of natural and synthetic pyrite is thought to be particularly well-suited. Taken together, these characteristics allow for a more conductive, efficient and/or higher capacity cathode.

The plurality of pyrite sources should have distinct particle size distributions so that, when the sources are combined and used in a single cathode, the combination provides a particle size distribution exhibiting at least two separate nodes. Depending upon the relative amounts of each individual source, the plot will exhibit multiple peaks along this volume-based distribution curve. A bimodal (i.e., two peaks, shoulders or high points) distribution is preferred, although any number of peaks is contemplated. Also, although the term "peak" is used to indicate a maximum within the particle size distribution, it will be readily understood that such peaks or maxima are measured relative to the normal or expected distribution of particles for the entire population of iron disulfide particles in the sample. That is, a mode or maximum may be represented as a discontinuity or "shoulder" along the distribution curve, rather than standing out as a distinct peak.

In one embodiment, an electrochemical cell is contemplated. The cell includes an anode, preferably consisting essentially of lithium or lithium alloy, a microporous polymeric separator and a cathode comprising iron disulfide. The iron disulfide has a plurality of maxima associated with mean diameter of the volume distribution of all of the iron disulfide particles present in the cathode. Preferably, all of these maxima will be less than 20 microns. In a separate embodiment, there are two maxima, with the first having a value of between 100 nanometers and 4 microns and the second having a value of between 5 microns and 15 microns. In another embodiment, the cathode material further comprises the iron disulfide with its plurality of maxima combined with a binder and a conductor, and this entire cathode mixture is coated onto a solid metal foil. In some embodiments, the thickness of the entire coated cathode on one side (inclusive of the solid metal foil) may be between 75 to 150 microns (or between 150 and 300 microns for coating on both sides) and/or between 5 and 30 times the largest of the plurality of maxima. Alternatively, the individual maxima may each be less than one half or less than one third of the thickness of the final, compacted cathode material coated onto a single side of the metal foil. Yet still other embodiments are set forth in the description below.

These and other features of the present invention will become apparent from the following detailed description in conjunction with the attached figures.

BRIEF DESCRIPTION OF THE DRAWINGS

The invention, including other features and advantages thereof, may be better understood with reference to the detailed description and the figures.

DETAILED DESCRIPTION OF THE PREFERRED EMBODIMENTS

Figure 1:
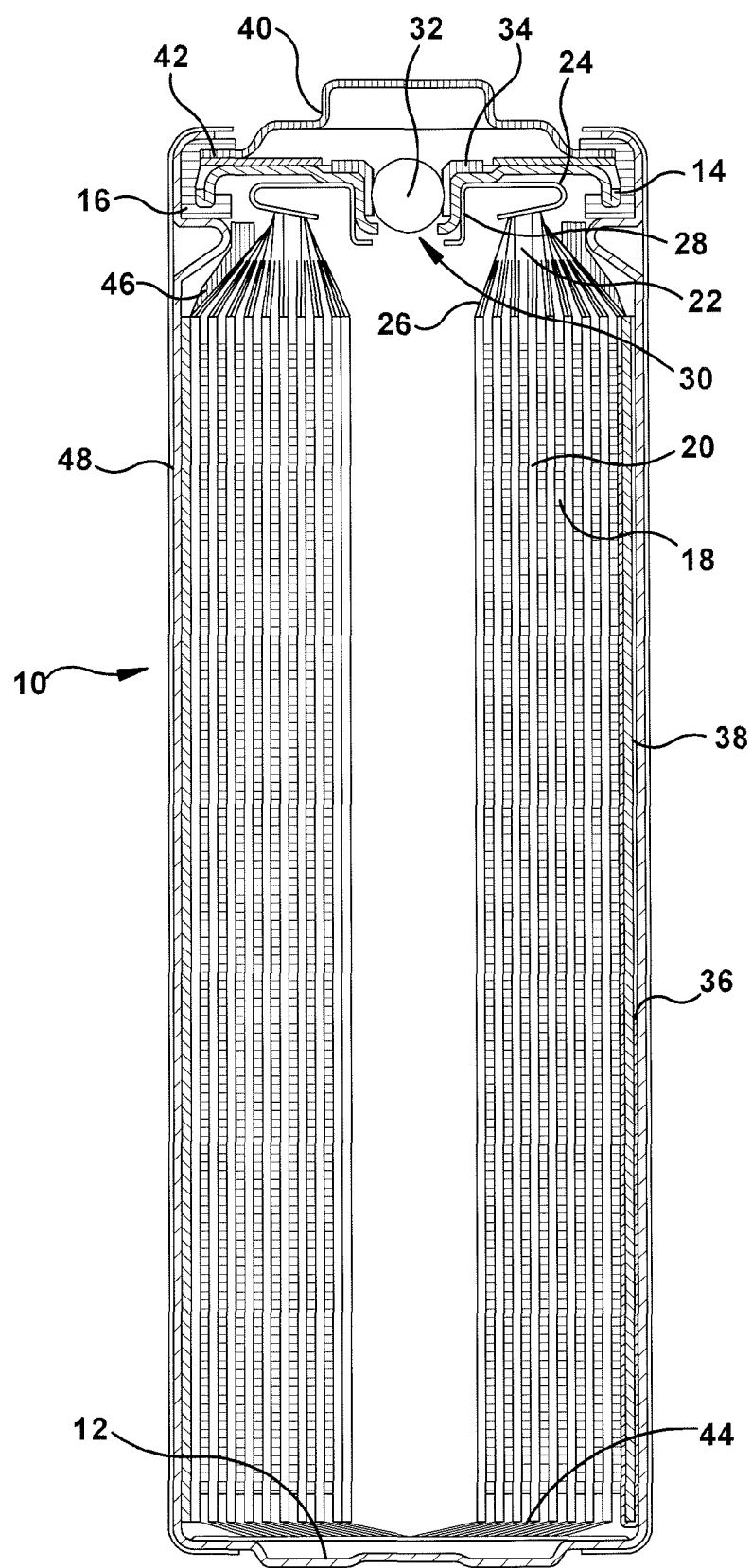
FIG. 1 shows one embodiment of a cell in accordance with the present invention.

Unless otherwise specified, as used herein the terms listed below are defined as follows:

Active material—one or more chemical compounds that are part of the discharge reaction of a cell and contribute to the cell discharge capacity, including impurities and small amounts of other moieties present.

Active material mixture—a mixture of solid electrode materials, excluding current collectors and electrode leads, that contains the electrode active material.

Agglomerate—a collection of discrete particles bound together or a collection of discrete crystallites bound together.

Average particle size—the mean diameter of the volume distribution of a sample of a composition (MV). The particle size distribution inherent to this definition of average particle size is measured by laser diffraction with sonification of the sample or other measures intended to break up agglomerates/prevent re-agglomeration as it is circulated through a properly calibrated laser diffraction instrument according to the manufacturers recommended settings. Two particularly well-suited instruments are the Microtrac Honeywell Particle Size Analyzer Model X-100 equipped with a Large Volume Recirculator (LVR) (4 L Volume) Model 9320 and the Cilas 1180 Particle Size Analyzer. With the Microtrac instrument, a sample of about 2.0 grams is weighed and placed into a 50 ml beaker. 20 ml of deionized water and 2 drops of surfactant (1% Aerosol OT solution prepared from 10 ml 10% Aerosol OT available from Fisher Scientific in 100 mls deionized water with the solution being well mixed). The beaker sample solution is stirred, such as with a stirring rod. The Large Volume Recirculator is filled to level with deionized water and the sample is transferred from the beaker to the Recirculator bowl. A wash bottle is used to rinse out any remaining sample particles into the Recirculator bowl. The sample is allowed to recirculate for one minute before measurements are started. The following parameters are input for $FeS_2$ particles: Transparent Particles—No (absorbing); Spherical Particles—No; Fluid Refractive Index—1.33; Run Time—60 seconds. It will be appreciated by those skilled in the arts that the above method may need to be adjusted and/or other laser diffraction instruments and techniques may be used to evaluate micron and nanometer-sized materials.

Crystallite (or grain or crystal)—an entity containing a chemically homogeneous solid having a repeating, ordered atomic arrangement that coherently diffracts an X-ray beam.

Crystallite size—size of a crystallite as calculated using the Scherrer Equation.

Electrode assembly—the combination of the negative electrode, positive electrode, and separator, as well as any insulating materials, overwraps, tapes, etc., that are incorporated therewith, but excluding any separate electrical lead affixed to the active material, active material mixture or current collector.

$FeS_2$ crystallite size—size of a $FeS_2$ crystallite as calculated using the Scherrer Equation and the X-Ray diffraction peak width of the {200} of pyrite in $FeS_2$.

Figure 2:
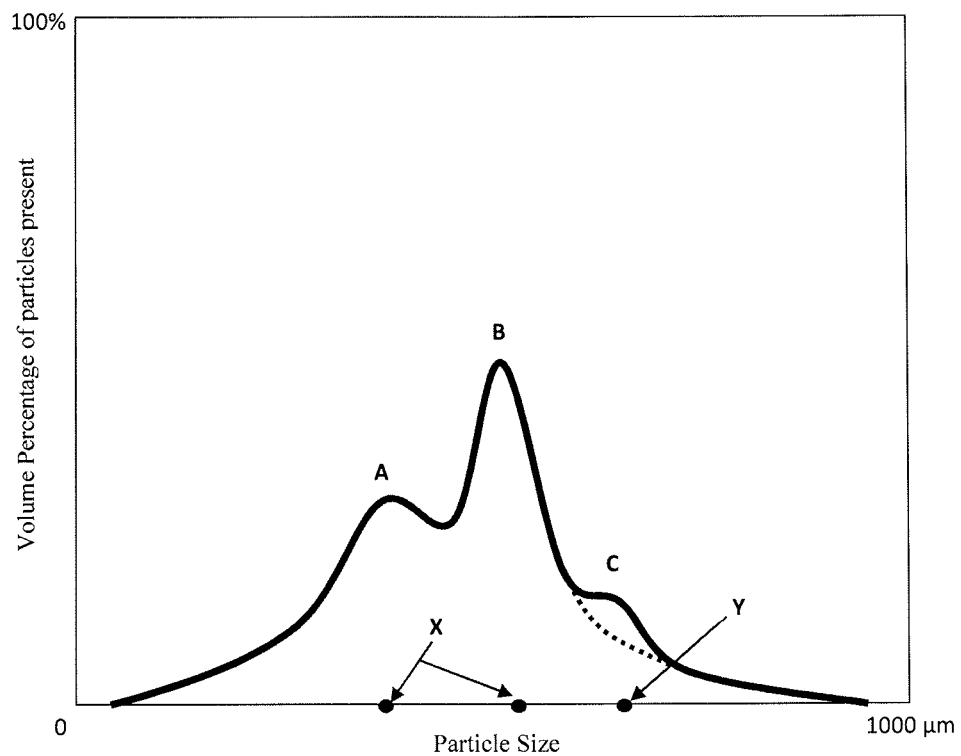
FIG. 2 illustrates an exemplary particle size distribution, based upon volume, exhibiting maxima that are characteristic of a multimodal distribution.
Figure 3A:
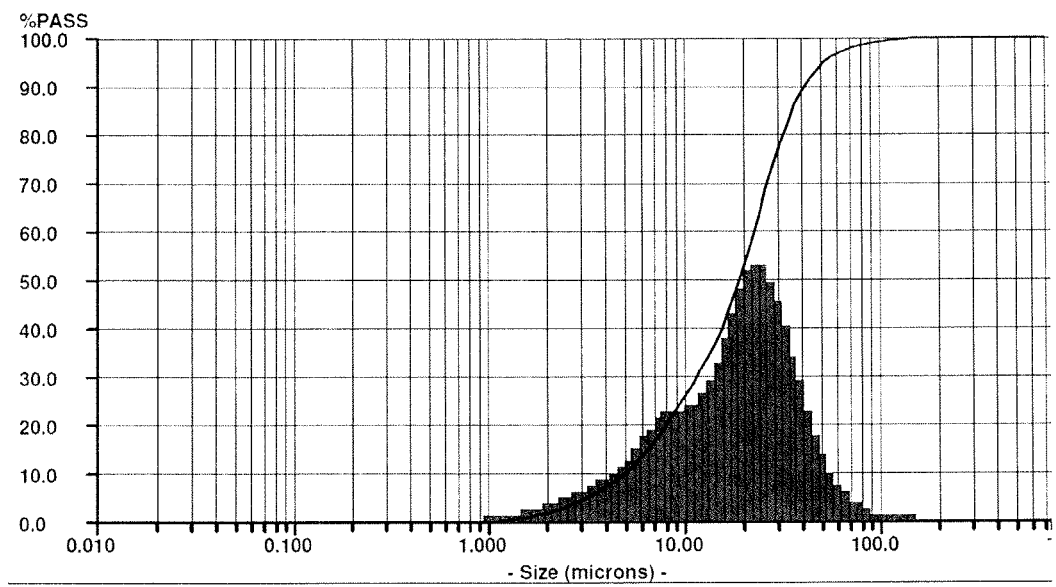
FIGS. 3A and 3B are, respectively speaking, particle size distributions for pyrite from naturally occurring ore on a volume basis, but with slightly different presentation as compared to FIG. 2, and a comparison of pyrite from a separate naturally occurring ore and a synthetic pyrite on a weight basis.
Figure 3B:
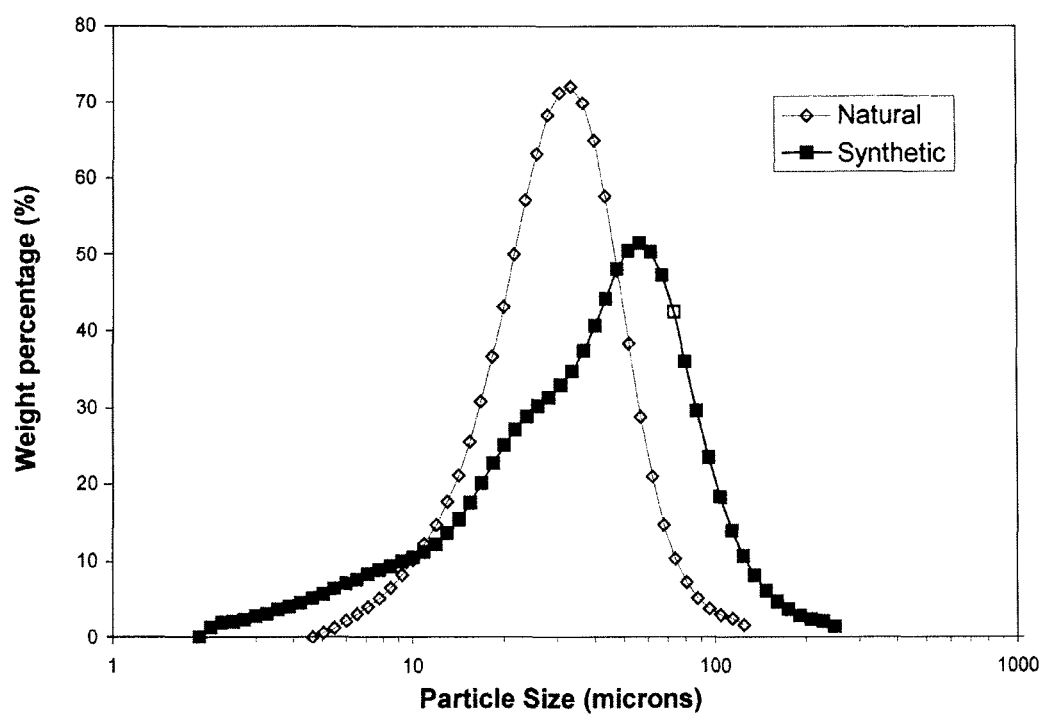

Maximum (plural, maxima)—when considered solely in the context of a plot of particle diameters against some measure of the concentration of those diameters (e.g., weight percentage, volume percentage, etc.), a node, mode or distinct peak in the curve relative to the other points immediately adjacent to the node/peak. When multiple maxima are present, the collection of particles under consideration may be described as multi-modal. An example of a multi-modal distribution is illustrated in FIG. 2, with points A, B and C representing maxima within the meaning of this definition. Each individual node, mode or peak is associated with a particle size value which effectively represents the high point X (for a peak) or at the approximate midpoint Y at which the curve deviates from the expected trajectory indicated by the broken line segment (for a node or mode).

Mean diameter of the particle size distribution—the average of the entirety of measurements of all of the individual particles present in the distribution. Distinct and separate from the median value.

Particle—a solid containing a single crystallite or two or more crystallites chemically bound together.

Percent discharge—the percentage of the rated capacity removed from a cell during discharge.

Room temperature—between about 20° C. and about 25° C., unless noted to the contrary.

A battery cell in accordance with the invention has an anode comprising metallic lithium as the negative electrode active material that is separated from a cathode comprising $FeS_2$, with the characteristics described in greater detail below, in the presence of an ionically conductive media. The anode and cathode may both be in the form of strips, which are joined together in an electrode assembly to provide a high interfacial surface area relative to the volumes of the electrodes containing active material. Typically, the higher the interfacial surface area, the lower the current density and the better the cell's capability to deliver high power on discharge. The cell also has a high ratio of cathode interfacial capacity to electrode assembly interfacial volume. This means that the volume of active materials in the electrode assembly is high, to provide a high discharge capacity. The high volume of active materials can be achieved by controlling a number of variables, including: the ratio of interfacial input capacity to total input capacity, the volume of the cathode current collector, the concentration of active cathode material in the cathode mixture, and the volume of separator in the electrode assembly. Various aspects of preferred cell designs can be found in United States Patent Publications 2011/0086254, 2010/221588 and 2009/0104520 and U.S. Pat. No. RE41,886, all of which are incorporated by reference.

FIG. 1 shows one embodiment of a cell in accordance with the present invention. The cell 10 is an FR6 type cylindrical Li/$FeS_2$ battery cell. The cell 10 has a housing that includes a can 12 with a closed bottom and an open top end that is closed with a cell cover 14 and a gasket 16. The can 12 has a bead or reduced diameter step near the top end to support the gasket 16 and cover 14. The gasket 16 is compressed between the can 12 and the cover 14 to seal an anode 18, a cathode 20 and electrolyte within the cell 10. The anode 18, cathode 20 and a separator 26 are spirally wound together into an electrode assembly. The cathode 20 has a metal current collector 22, which extends from the top end of the electrode assembly and is connected to the inner surface of the cover 14 with a contact spring 24. The anode 18 is electrically connected to the inner surface of the can 12 by a metal tab (not shown). An insulating cone 46 is located around the peripheral portion of the top of the electrode assembly to prevent the cathode current collector 22 from making contact with the can 12, and contact between the bottom edge of the cathode 20 and the bottom of the can 12 is prevented by the inward-folded extension of the separator 26 and an electrically insulating bottom disc 44 positioned in the bottom of the can 12. The cell 10 has a separate positive terminal cover 40, which is held in place by the inwardly crimped top edge of the can 12 and the gasket 16. The can 12 serves as the negative contact terminal. Disposed between the peripheral flange of the terminal cover 40 and the cell cover 14 is a positive temperature coefficient (PTC) device 42 that substantially limits the flow of current under abusive electrical conditions. The cell 10 also includes a pressure relief vent. The cell cover 14 has an aperture comprising an inward projecting central vent well 28 with a vent hole 30 in the bottom of the well 28. The aperture is sealed by a vent ball 32 and a thin-walled thermoplastic bushing 34, which is compressed between the vertical wall of the vent well 28 and the periphery of the vent ball 32. When the cell internal pressure exceeds a predetermined level, the vent ball 32, or both the ball 32 and bushing 34, is forced out of the aperture to release pressurized gases from the cell 10.

The cell container is often a metal can with an integral closed bottom; though a metal tube that is initially open at both ends may also be used instead of a can. The can may be steel, that is plated with nickel on at least the outside to protect the outside of the can from corrosion. The type of plating can be varied to provide varying degrees of corrosion resistance or to provide the desired appearance. The type of steel will depend in part on the manner in which the container is formed. For drawn cans the steel can be a diffusion annealed, low carbon, aluminum killed, SAE 1006 or equivalent steel, with a grain size of ASTM 9 to 11 and equiaxed to slightly elongated grain shape. Other steels, such as stainless steels, can be used to meet special needs. For example, when the can is in electrical contact with the cathode, a stainless steel may be used for improved resistance to corrosion by the cathode and electrolyte.

The cell cover is typically metal. Nickel plated steel may be used, but a stainless steel may be desirable, especially when the cover is in electrical contact with the cathode. The complexity of the cover shape will also be a factor in material selection. The cell cover may have a simple shape, such as a thick, flat disk, or it may have a more complex shape, such as the cover shown in FIG. 1. When the cover has a complex shape like that in FIG. 1, a type 304 soft annealed stainless steel with ASTM 8-9 grain size may be used, to provide the desired corrosion resistance and ease of metal forming. Formed covers may also be plated with any suitable material such as, for example, nickel.

The terminal cover should have good resistance to corrosion by water in the ambient environment, good electrical conductivity and, when visible on consumer batteries, an attractive appearance. Terminal covers are often made from nickel plated cold rolled steel or steel that is nickel plated after the covers are formed. Where terminals are located over pressure relief vents, the terminal covers generally have one or more holes to facilitate cell venting.

The gasket may be made from any suitable thermoplastic material that provides the desired sealing properties. Material selection is based in part on the electrolyte composition. Examples of suitable materials include, but are not limited to, polypropylene, polyphenylene sulfide, tetrafluoride-perfluoroalky-1 vinylether copolymer, polybutylene terephthalate, and combinations thereof. Particularly suitable gasket materials include polypropylene (e.g., PRO-FAX® 6524 from Basell Polyolefins, Wilmington, Del., USA), polybutylene terephthalate (e.g., CELANEX® PBT, grade 1600A from Ticona-US, Summit, N.J., USA) and polyphenylene sulfide (e.g., TECHTRON® PPS from Boedeker Plastics, Inc., Shiner, Tex., USA). Small amounts of other polymers, reinforcing inorganic fillers and/or organic compounds may also be added to the base resin of the gasket.

The gasket may be coated with a sealant to provide the best seal. Ethylene propylene diene terpolymer (EPDM) is a suitable sealant material, but other suitable materials can be used.

The vent bushing may be made from a thermoplastic material that is resistant to cold flow at high temperatures (e.g., 75° C.). The thermoplastic material comprises a base resin such as, for example, ethylene-tetrafluoroethylene, polybutylene terephthlate, polyphenylene sulfide, polyphthalamide, ethylenechloro-trifluoroethylene, chlorotrifluoroethylene, perfluoroalkoxyalkane, fluorinated perfluoroethylene polypropylene and polyetherether ketone. Particularly suitable resins include ethylene-tetrafluoroethylene copolymer (ETFE), polyphenylene sulfide (PPS), polybutylene terephthalate (PBT), and polyphthalamide. The resin can be modified by adding a thermal-stabilizing filler to provide a vent bushing with the desired sealing and venting characteristics at high temperatures. The bushing can be injection molded from the thermoplastic material. TEFZEL® HT2004 (ETFE resin with 25 weight percent chopped glass filler) is an example of a suitable thermoplastic material.

The vent ball can be made from any suitable material that is stable in contact with the cell contents and provides the desired cell sealing and venting characteristic. Glasses or metals, such as stainless steel, can be used.

As an alternative to the ball vent design shown in FIG. 1, it is possible to utilize a rupturable foil vent, similar to the one described in U.S. Pat. No. 7,923,138. As used herein, a foil vent includes any mechanism designed to relieve internal pressure build up within the cell, and it may include thicker metallic or polymeric members having one or more grooves or "coined" sections.

The anode comprises a strip of lithium metal, sometimes referred to as lithium foil. The composition of the lithium can vary, though for battery grade lithium the purity is always high. The lithium can be alloyed with other metals, such as aluminum, magnesium, and the like, to provide the desired mechanical and/or electrical performance. Battery grade lithium-aluminum foil containing 0.5 weight percent aluminum is available from Chemetall Foote Corp., Kings Mountain, N.C., USA.

The anode may have a current collector, within or on the surface of the metallic lithium. As in the cell in FIG. 1, a separate current collector may not be needed, since lithium has a high electrical conductivity, but a current collector may be included, for example, to maintain electrical continuity within the anode during discharge, as the lithium is consumed. When the anode includes a current collector, it may be made of copper because of its conductivity, but other conductive metals can be used as long as they are stable inside the cell. More ideally, the anode consists essentially of lithium or a lithium alloy connected to the terminal by a small lead, and the use of a full current collector along the entire length of the anode strip is not necessary, thereby freeing up more internal volume for active materials.

A thin metal strip often serves as an electrical lead, or tab, connecting the anode to one of the cell terminals (the can in the case of the FR6 cell shown in FIG. 1). The metal strip is often made from nickel or nickel plated steel and affixed directly to the lithium. This may be accomplished by embedding an end of the lead within a portion of the anode or by simply pressing an end of the lead onto the surface of the lithium foil. The strip may then be welded or shaped so as to maintain a pressure contact with the container, preferably along its sidewall or bottom.

The cathode may be in the form of a strip that comprises a current collector and a cathode formulation that includes one or more electrochemically active materials in particulate form. The cathode formulation, which is typically a slurry, comprises synthetic iron disulfide as an active material. The active material may comprise greater than about 50 weight percent iron disulfide, either from natural pyrite ore or synthetic sources. More ideally, the active material should comprise at least 90 weight percent, at least 95 weight percent $FeS_2$, and in a preferred embodiment, iron disulfide is the sole active cathode material. The active material may comprise only natural ore pyrite or synthetic iron disulfide, provided the foregoing guidance on maxima within the particle size distribution of the pyrite is observed. However, a combination of synthetic and natural materials is also contemplated, as it can provide benefits inherent to both. In cases where only natural ore is used, separate milling operations will be required to produce maxima within the preferred ranges contemplated herein.

The cathode may also contain one or more additional active materials, depending on the desired cell electrical and discharge characteristics. The additional active cathode material may be any suitable active cathode material. Examples of other active materials include, but are not limited to, $Bi_2O_3$, $C_2F$, FeS, $CF_x$, $(CF)_n$, $CoS_2$, CuO, CuS, FeS, $FeCuS_2$, $MnO_2$, $Pb_2Bi_2O_5$, S, or mixtures thereof. Some forms of pyrite and lesser order iron sulfides can be deliberately "doped" with certain metallic elements (which may be inserted within the crystalline structure of the iron disulfide) and/or mixed with any of the aforementioned materials. However, the active material in the cathode of a lithium-iron disulfide cell must, by definition, include a majority of iron disulfide, and the principles relating to multimodal particle size selection are limited to the iron disulfide particles.

As noted above, the particle size of the preferred forms of electrochemically active iron disulfide material is a key aspect of the invention. Although some natural pyrite ores and certain synthetic forms may exhibit a particle distribution with two modes (i.e., a bimodal distribution of particle sizes), the overall mean diameter for the volume distribution of these sources have been in excess of 20 microns. For example, as seen in FIG. 2A, one known natural pyrite source exhibits two modes in the volume distribution at 7 microns and 22 microns, although the mean diameter for this distribution is 22 microns. Separately, one known example of the synthetic pyrite in the literature exhibits modes in the weight distribution at 20 microns and 60 microns, as seen in FIG. 2B.

One embodiment of the invention contemplates the use of two different iron disulfide sources, so that the final cathode exhibits two or more distinct modes in its particle size distribution on a volume basis, where at least one mode is less than 20 microns. Stated differently, a plurality of maxima in the mean diameter based upon the volume distribution of all iron disulfide contained within the cathode are contemplated, and at least one of those means must be less than 20 microns. More preferably, two of the maxima or, most preferably, all of the maxima are centered at less than 20 microns in the volume distribution. As an additional consideration, the mean diameter of the volume distribution for the combination of pyrite sources must be less than 20 microns.

All particle size measurements and distributions must exclude the particle size contribution attributable to conductors, binders or other non-active species in the cathode. Accordingly, the particle size distribution for only iron disulfide particles contained within an overall cathode mixture can be determined by a difference method, and the particles size contributions of the conductive and other non-active particulate components are subtracted from the overall particle size distribution of the entire cathode mixture. In the event the particle size distribution of the pyrite is unknown prior to the creation of the cathode component, it is possible to remove the cathode mix by selectively dissolving the binder and then further separating or dissolving the non-pyrite components contained in the cathode mix. All such particle size distribution measurements should be made on at least a volume basis using a laser diffraction instrument, with the mean of the diameters representing the particle size; however, the exigencies of a particular sample may permit or even necessitate modification of the parameters and/or preferred equipment noted above.

The use of a bimodal or multimodal iron disulfide powder wherein the mean diameter of the entire distribution is less than 20 microns and wherein some or all of the maxima of the mean diameter, on a volume basis, are less than 20 microns imparts the cathode with superior flow, processability, capacity and/or performance characteristics. Without wishing to be limited to any one theory, it is believed that complimentary selection and manipulation of the maxima will allow for better particle-to-particle contact and/or better packing within the cathode. In turn, a mean diameter for the entire distribution that is less than 20 microns seems to improve service performance, particularly at low temperatures.

This approach may also create benefits for the efficient use of, and minimal need for, void space within the coating. That is, the selection of two or more sources can be affected so that the particle size distributions of each source are complimentary to one another. For example, by selecting sources with mean diameters of the volume distribution according to the criteria set forth herein, higher density coatings may be created, possibly obviating the need for mechanical compaction and/or calendaring of the coating. In turn, this may lead to the use of thinner current collectors, current collectors having reduced tensile strengths and/or current collectors with reduced or eliminated need for annealing. By way of example rather than limitation, complimentary particle size distributions may include one source with a submicron mean diameter of the volume distribution (e.g., 100 nanometers to 4 microns) while the other source possesses a larger such mean (e.g., 5 microns to 20 microns).

Nevertheless, complimentary selection may additionally or alternatively take into consideration the overall distribution in order to better affect the aforementioned goals. Thus, consideration of the total percentage of the volume distribution representing particles possessing a stated size could be significant. As further examples, it may be beneficial for up 90%, up to 75% or up to 50% of the particles in the volume distribution to possess one or both of stated particle sizes (e.g., 100 microns to 4 microns and/or 5 microns to 20 microns).

Notably, the non-spherical and inconsistent shape and morphology of pyrite necessarily means that the particles cannot and will not fit perfectly. Thus, past research relating to spherical-shaped particles is inapposite.

In one embodiment, the first maximum in the final particle size distribution should be between 100 nanometers and 4 microns. More specifically, the first maximum may be 100, 250, 500 or 750 nanometers or 1, 2, 3 or 4 microns. This maxima may be associated with a synthetic iron disulfide source. Alternatively, this maxima may be produced through the milling of a natural pyrite ore. The second maximum may be between 5 and 15 microns. More specifically, the second maximum may be 5, 7, 9, 10, 11, 13 or 15 microns. Preferably, this maxima may be produced through the milling of natural pyrite ore. Alternatively, this maxima may be engineered through the extended sintering, and optional milling or processing, of synthetic sources. When the two sources or more are combined together, the mean diameter of the volume distribution should still be less than 20 microns. More specifically, the mean diameter should be less than 20 microns, less than 19 microns, less than 17 microns or less than 15 microns, and greater than 100 nanometers, greater than 1 mircon, greater than 2 microns, greater than 3 microns, greater than 4 microns or greater than 5 microns. In one embodiment, the mean diameter of the entire distribution will fall between the particle size smallest and largest values representative of all of the modes present in that distribution.

Owing to the extremely small particle sizes (i.e., 20 microns or less) and irregular particle shapes, it is not feasible to reliably screen or sieve particles to the mean diameters contemplated by this invention because feasible screening operations at a production scale still allow particles as large as 62 microns to pass. In the same manner, owing to the action of media or other milling processes, it is not believed to be possible to utilize a single milling operation to reliably and reproducibly achieve the distinct multimodal distributions contemplated by this invention, particularly with the maxima described herein.

In another embodiment, the first maximum representative of a first pyrite source is greater than 100 nanometers and less than 20 microns. More preferably, this first maximum is 100, 250, 500 or 750 nanometers or 1, 2, 3, 4, 5, 7, 9, 10, 11, 13 or 15 microns. Any additional maxima are representative of a second, distinct pyrite source and may be greater than 20 microns, greater than 40 microns or greater than 50 microns. The additional maxima may also be less than 20 microns but still greater than the first maximum in this particular embodiment. The any additional maxima may include a second maximum, a third maxima, a fourth maxima and a plurality of maxima.

The iron disulfide used to construct the cathode and electrochemical cell can come from a combination of different sources, including natural ore, synthetic and combinations thereof. To the extent two separate in-line milling operations are used, the production facility may be configured so that the milling of pyrite ore occurs in two separate containers with separate milling parameters and/or resident times. These separated streams are then combined into a single slurry at point downstream from the milling but upstream from the actual coating operation. Alternatively, the sources may be dry mixed. To the extent synthetic source or sources are used, it is possible to integrate the reaction vessel or continuous reaction process into the cathode fabrication process. By way of example rather than limitation, the sulfidation process described in United States Patent Publication 2010/0303711 could include a rotary evaporative vessel or an in-line sintering oven which is configured to feed synthetic pyrite directly into the slurry coating operation.

The relative amounts of each pyrite can be optimized to allow for sufficient cathode voids, to improve particle-to-particle contact and/or to better accommodate compaction of the coated material, as previously noted. As such, the source providing the largest of the maxima is normally the largest component out of the total number of sources of iron disulfide introduced to the cathode mixture, irrespective of whether the sources include synthetic or natural pyrite and irrespective of whether any of the sources are milled, sintered or otherwise processed to create modes and/or adjust the particle size distribution. For example, the source contributing the largest maxima can comprise at least one half, on a volume or weight basis, of the overall iron disulfide added to the cathode mixture. If only two sources having two distinct maxima are used, the source having the larger maxima can be provided at a ratio of 1:1, 2:1, 3:1, 4:1, 5:1, 7:1 or 10:1 (in this ratio, larger maxima material:smaller maxima material) on weight basis or on a volume basis. If three or more sources are used, the source having the largest maxima should be provided in the largest amount, although it need not comprise a majority of the overall iron disulfide provided to the cathode mix. For example, in an embodiment having three or more maxima (or three or more distinct sources of pyrite, according to the methodologies for adjusting the maxima of the volume distribution discussed elsewhere herein), the largest of the maxima should comprise at least 10% but no greater than 50%, no greater than 40%, no greater than 30%, no greater than 25% or no greater than 20%, on a volume basis or on a weight basis, in comparison to the other maxima.

As for the precise particle size value associated with each maxima, the plurality of maxima may be expressed as a function of the relative sizes of each maxima. That is, the first maximum may be as many as 10 times larger than the second maximum (or the next closest maxima). More specifically, the first maximum may be 10 times, 7 times, 5 times, 3 times, 2 times or 1.5 times larger than the second maximum.

The plurality of maxima may also be expressed as a function of the thickness of the overall cathode, provided that cathode is coated onto at least portions of both sides of a thin solid metal foil current collector (as described in greater detail below). Thus, the thickness of the final, coated and compacted cathode, disposed on both sides of the current collector and including the thickness contribution of the current collector, can be between 5 times and 30 times greater than the largest maxima of mean diameter of the particle size distribution on a volume basis for the iron disulfide present in the cathode mixture. More specifically, the cathode thickness may be 5 times, 10 times, 15 times, 20 times, 25 times or 30 times thicker than the first or the largest of the maxima.

Alternatively, the plurality of maxima may be expressed as a function of just the coating thickness of the final, compacted cathode disposed at least partially on one side of the current collector, excluding the foil thickness and the thickness of any corresponding coating on the opposite side of the foil. In this instance, each of the maxima (i.e., considered on an individual basis) should be less than one half of the coating thickness or less than one third the coating thickness.

The foregoing principles are equally applicable to pyrite and other iron disulfide-based materials identified herein which encompass multi-step discharge reactions involving both intercalation and displacement reactions and which undergo significant volumetric expansion as the discharge reactions progress. In this regard, the definition of pyrite set forth above should be afforded a more expansive understanding so that doped pyrite and lesser order sulfides exhibiting pyrite-like electrochemical characteristics are expressly contemplated, although mono-sulfides (e.g., FeS) and other mineral forms, especially those exhibiting diminished electrochemical capacity or reactivity, are expressly excluded. Ultimately, as a matter of maximizing the electrochemical capacity of a cell, it is preferred to use materials with the highest practical degree of sulfidation. Thus, if expressed as $FeS_x$, the most preferred materials have x=2 while other materials may posses $1.5<x<2$, $1.75<x<2$, and $1.9<x<2$. The mere fact that a naturally occurring ore necessarily encompasses impurities which may cause the material to exhibit less than theoretical capacity based on the weight of the ore, such ores are still within the meaning of pyrite and $FeS_2$ provided the ore exhibits peaks in its x-ray diffraction spectra that are consistent with the presence of pyrite. Conversely, ores that do not exhibit such spectra are expressly excluded.

It should also be noted that the foregoing considerations are relative to the overall distribution of all of the iron disulfide particles on a volume basis. In this context, it will be understood that the iron disulfide sources contemplated herein will actually include a wide range of different particle sizes, wherein the largest individual particle can be in excess of 100 microns and the smallest individual particle may be on the order of tens of nanometers, even if the mean diameter of the overall cathode is less than 20 microns and even if the plurality of maxima all range between 100 nanometers and 60 microns.

In addition to the active material, the cathode mixture typically contains other materials. For example, a binder is generally used to hold the particulate materials together and adhere the mixture to the current collector. One or more conductive materials such as metal, graphite and carbon black powders may be added to provide improved electrical conductivity to the mixture. The amount of conductive material used can be dependent upon factors such as, for example, the electrical conductivity of the active material and binder, the thickness of the mixture on the current collector, the current collector design, and the like. Small amounts of various additives may also be used to enhance cathode manufacturing and cell performance. The following are examples of active material mixture materials for $Li/FeS_2$ cell cathodes. graphites (including but not limited to synthetic graphites from Timcal America, Westlake, Ohio, USA), carbon blacks (including but not limited to acetylene blacks from Chevron Phillips Company LP, Houston, Tex., USA), binder (including but not limited to ethylene/propylene copolymer (PEPP) made by Polymont Plastics Corp. or Harwick Standard Distribution Corp., Akron, Ohio, USA; non-ionic water soluble polyethylene oxides (PEO) from Dow Chemical Company, Midland, Mich., USA; and styrene-ethylene/butylenes-styrene (SEBS) block copolymers from Kraton Polymers, Houston, Tex., USA) and rheological additives (including but not limited to micronized polytetrafluoroethylene (PTFE) manufactured by Micro Powders Inc., Tarrytown, N.Y., USA or fumed silica from Degussa Corporation Pigment Group, Ridgefield, N.J., USA). The following are representative of a preferred cathode mixture formulation: 91.0 to 99.0 wt. % of pyrite, 0.1 to 3.0 wt. % of carbonaceous conductors, 0.1 to 3.0 wt. % of binders and 0 to 1.0 wt. % of processing aids (e.g., rheological additives and the like). As noted above, the particle size contributions of these other components should be excluded from the determination of a multimodal distribution according to certain embodiments of this invention.

A method of making a cathode based upon the foregoing principles is also contemplated. Here, a first iron disulfide source is selected or created (via synthesis, miling, etc.) to have one or more modes, based on the volume distribution, that is less than 20 microns and greater than 100 nanometers. In the same manner, at least second source is selected or created to have mode(s) that is/are consistent with any of the embodiments described above. These sources are then combined to create a single iron disulfide powder having a plurarality of maxima (i.e., multimodal distribution, when the final combination is considered singly) and a mean diameter of the particle size distribution on a volume basis that is between 100 nanometers and 20 microns, and this powder is used in the construction of a lithium-iron disulfide battery according to the disclosure herein. Preferably, the powder is mixed with a slurry and coated onto a current collector. Optionally, additional sources may also be used, provided those sources impart additional maxima to the final powder. As noted above, the specific maxima may be selected to improve certain aspects of the resulting powder, slurry and/or battery itself.

In the event multiple sources are used, it is possible to employ separate mills in parallel, with the slurry output of these mills subsequently mixed prior to the coating operation. In this manner, it becomes possible to utilize naturally occurring pyrite sources without the need for incorporating synthetic materials. In this arrangement, the mills would possess different milling media, flow rates, slurry formulations and/or resident times to affect the differences in particle size distribution and, more specifically, differences in the mean diameter of the volume distribution and/or the other differences contemplated herein.

The current collector may be disposed within or imbedded into the cathode surface, or the cathode mixture may be coated onto one or both sides of a thin metal strip. Aluminum is a commonly used material. The current collector may extend beyond the portion of the cathode containing the cathode mixture. This extending portion of the current collector can provide a convenient area for making contact with the electrical lead connected to the positive terminal. Additionally, the material may be intermittently coated to optimize active material usage within the cell. In all cases, it is desirable to keep the volume of the extending portion of the current collector to a minimum to make as much of the internal volume of the cell available for active materials and electrolyte.

In a preferred embodiment, $FeS_2$ cathodes may be made by coating a slurry of active material mixture materials in a highly volatile organic solvent (e.g., trichloroethylene) onto both sides of a sheet of aluminum foil, drying the coating to remove the solvent, calendering the coated foil to compact the coating, slitting the coated foil to the desired width, and cutting strips of the slit cathode material to the desired length.

In other embodiments, other types of current collectors may be used, such as expanded metals, and other types of cathode coating or productions processes might be used. In still other embodiments, coin or button cell constructions may be utilized. However, solid foil current collectors in conjunction with spirally wound jellyroll electrodes are preferred.

The cathode is electrically connected to the positive terminal of the cell. This may be accomplished with an electrical lead, often in the form of a thin metal strip or a spring which may allow for a pressure contact, as shown in FIG. 1. The lead is often made from nickel plated stainless steel. The lead may also be welded.

The separator may be a thin microporous membrane that is ion-permeable and electrically nonconductive. It is capable of holding at least some electrolyte within the pores of the separator. The separator is disposed between adjacent surfaces of the anode and cathode to electrically insulate the electrodes from each other. Portions of the separator may also insulate other components in electrical contact with the cell terminals to prevent internal short circuits. Edges of the separator often extend beyond the edges of at least one electrode to insure that the anode and cathode do not make electrical contact even if they are not perfectly aligned with each other. It may be desirable to minimize the amount of separator extending beyond the electrodes.

To provide good high power discharge performance it may be desirable that the separator have the characteristics (pores with a smallest dimension of at least 0.005 µm and a largest dimension of no more than 5 µm across, a porosity in the range of 30 to 70 percent, an area specific resistance of from 2 to 15 ohm-cm$^2$ and a tortuosity less than 2.5) disclosed in U.S. Pat. No. 5,290,414, issued Mar. 1, 1994, and hereby incorporated by reference. Suitable separator materials should also be strong enough to withstand cell manufacturing processes as well as pressure that may be exerted on the separator during cell discharge without tears, splits, holes or other gaps developing that could result in an internal short circuit.

To minimize the total separator volume in the cell, the separator should be as thin as possible, but at least about 1 µm or more so a physical barrier is present between the cathode and anode to prevent internal short circuits. That said, the separator thickness may range from about 1 to about 50 µm, desirably from about 5 to about 25 and preferably from about 10 to about 16 or about 20 µm. The required thickness will depend in part on the strength of the separator material and the magnitude and location of forces that may be exerted on the separator where it provides electrical insulation.

Separator membranes for use in lithium batteries are often made of polypropylene, polyethylene or ultrahigh molecular weight polyethylene, with polyethylene being preferred. The separator can be a single layer of biaxially oriented microporous membrane, or two or more layers can be laminated together to provide the desired tensile strengths in orthogonal directions, although a single layer may help minimize the cost. Suitable separators are available from Tonen Chemical Corp., which is affiliated with ExxonMobil Corporation of Houston, Tex., USA and Entek Membranes in Lebanon, Oreg., USA.

The anode, cathode, and separator strips are combined together in an electrode assembly. The electrode assembly may be a spirally wound design, such as that shown in FIG. 1, made by winding alternating strips of cathode, separator(s), anode, and separator around a mandrel, which is extracted from the electrode assembly when winding is complete. At least one layer of separator and/or at least one layer of electrically insulating film (e.g., polypropylene) is generally wrapped around the outside of the electrode assembly. This serves a number of purposes: it helps hold the assembly together and may be used to adjust the width or diameter of the assembly to the desired dimension. The outermost end of the separator or other outer film layer may be held down with a piece of adhesive tape or by heat sealing.

The electrode assembly is inserted into the housing container. In the case of a spirally wound electrode assembly, whether in a cylindrical or prismatic container, the major surfaces of the electrodes are perpendicular to the side wall(s) of the container (in other words, the central core of the electrode assembly is parallel to a longitudinal axis of the cell). Folded electrode assemblies are typically used in prismatic cells. In the case of an accordion-folded electrode assembly, the assembly is oriented so that the flat electrode surfaces at opposite ends of the stack of electrode layers are adjacent to opposite sides of the container. In these configurations the majority of the total area of the major surfaces of the anode is adjacent the majority of the total area of the major surfaces of the cathode through the separator, and the outermost portions of the electrode major surfaces are adjacent to the side wall of the container. In this way, expansion of the electrode assembly due to an increase in the combined thicknesses of the anode and cathode is constrained by the container side wall (s).

A nonaqueous electrolyte, containing water only in very small quantities (e.g., no more than about 500 parts per million by weight, depending on the electrolyte salt being used), is used in the battery cell of the invention. Any nonaqueous electrolyte suitable for use with lithium and active cathode material may be used. The electrolyte contains one or more electrolyte salts dissolved in an organic solvent. For a $Li/FeS_2$ cell, examples of suitable salts include lithium bromide, lithium perchlorate, lithium hexafluorophosphate, lithium hexafluoroarsenate, lithium trifluoromethanesulfonate, lithium bistrifluoromethylsulfonyl imide, lithium iodide and mixtures and/or analogs thereof (e.g., potassium hexafluorophosphate). Suitable organic solvents include one or more of the following: dimethyl carbonate, diethyl carbonate, methylethyl carbonate, ethylene carbonate, propylene carbonate, 1,2-butylene carbonate, 2,3-butylene carbonate, methyl formate, γ-butyrolactone, sulfolane, acetonitrile, 3,5-dimethylisoxazole, n,n-dimethyl formamide, and ethers. The salt/solvent combination will provide sufficient electrolytic and electrical conductivity to meet the cell discharge requirements over the desired temperature range. Ethers are often desirable because of their generally low viscosity, good wetting capability, good low temperature discharge performance and good high rate discharge performance. This is particularly true in $Li/FeS_2$ cells because the ethers are more stable than with $MnO_2$ cathodes, so higher ether levels can be used. Suitable ethers include, but are not limited to acyclic ethers such as 1,2-dimethoxyethane, 1,2-diethoxyethane, di(methoxyethyl)ether, triglyme, tetraglyme, and diethyl ether; and cyclic ethers such as 1,3-dioxolane, tetrahydrofuran, 2-methyl tetrahydrofuran, and 3-methyl-2-oxazolidinone. A particularly suitable non-aqueous electrolyte is an electrolyte comprising lithium iodide in a solvent comprising at least one ether as disclosed in U.S. Pat. No. 5,514,491, the entire disclosure of which is incorporated herein by reference.

The cell can be closed and sealed using any suitable process. Such processes may include, but are not limited to, crimping, redrawing, collecting, and combinations thereof. For example, for the cell in FIG. 1, a bead is formed in the can after the electrodes and insulator cone are inserted, and the gasket and cover assembly (including the cell cover, contact spring and vent bushing) are placed in the open end of the can. The cell is supported at the bead while the gasket and cover assembly are pushed downward against the bead. The diameter of the top of the can above the bead is reduced with a segmented collet to hold the gasket and cover assembly in place in the cell. After electrolyte is dispensed into the cell through the apertures in the vent bushing and cover, a vent ball is inserted into the bushing to seal the aperture in the cell cover. A PTC device and a terminal cover are placed onto the cell over the cell cover, and the top edge of the can is bent inward with a crimping die to hold the gasket, cover assembly, PTC device and terminal cover and complete the sealing of the open end of the can by the gasket.

In view of the foregoing, specific embodiments of the invention may encompass a cathode material, a lithium-iron disulfide electrochemical cell comprising the cathode material, a method for making a cathode and a method for making an electrochemical cell. The cathode material may include any combination of the following: a plurality of maxima of mean diameters for the volume distribution of all iron disulfide particles present in the cathode, wherein all of said maxima are less than 20 microns; wherein the cathode material is coated onto a solid metal foil; wherein a first maximum has a mean diameter of the volume distribution that is between 5 µm and 15 µm and a second maximum has a mean diameter of the volume distribution that is between 100 nm and 4 µm; wherein a thickness of the coated cathode material is between 5 and 30 times greater than the first maximum; wherein each maximum comprising the plurality of maxima, when considered on an individual basis, is less than one half of a thickness of the coated cathode material; wherein each maximum comprising the plurality of maxima, when considered on an individual basis, is less than one third of a thickness of the coated cathode material; wherein the iron disulfide includes naturally occurring iron disulfide which accounts for a first maximum of mean diameters of the volume distribution and synthetic iron disulfide accounts for a second maximum of mean diameters of the volume distribution; wherein the first maximum is between 5 µm and 15 µm and the second maximum is between 100 nm and 4 µm; wherein two separate sources of pyrite are combined to have a plurality of maxima associated with mean diameters in the volume distribution of all iron disulfide particles present in the cathode and wherein at least one of said maxima is between 100 nanometers and 20 microns; wherein the maxima is no greater than 15 microns; wherein the maxima is at least 1 micron; and wherein the maxima is no greater than 4 microns. The method may comprise any combination of the following steps: selecting a first source of pyrite and milling the first source in a slurry, said first source having a first mean diameter of the volume distribution measured after the milling; introducing a second source of pyrite into the slurry, said second source having a second mean diameter of the volume distribution that is not equal to the first mean diameter; coating the slurry containing the first and second sources onto a current collector; wherein the second source is milled in the presence of a second slurry, the second mean diameter is measured after the milling and the second slurry is introduced to the slurry containing the first source prior to the coating step; wherein the second mean diameter is between 100 nanometers and 4 microns; wherein the first mean diameter is between 5 and 20 microns; wherein the second source comprises a synthetic pyrite; and wherein a particle size distribution of the second source is selected to be complimentary to a particle size distribution of the first source.

The above description is particularly relevant to cylindrical $Li/FeS_2$ cells, such as FR6 and FR03 types, as defined in International Standards IEC 60086-1 and IEC 60086-2, published by the International Electrotechnical Commission, Geneva, Switzerland. However, the invention may also be adapted to other cell sizes and shapes and to cells with other electrode assembly, housing, seal and pressure relief vent designs.

While the present invention has been described herein with reference to various exemplary embodiments thereof, the invention is not intended to be limited to such embodiments. Further, upon reading and understanding the present application, modifications and changes may occur to those skilled in the art without departing from the spirit of the disclosed technology. It is intended that the disclosed technology be considered as including all such modifications and changes.

The invention claimed is:

1. A cathode for a lithium iron disulfide electrochemical cell having a plurality of maxima of mean diameters in a volume-based particle size distribution of all iron disulfide particles present in the cathode material and a mean diameter of the volume-based particle size distribution that is greater than 100 nanometers and less than 20 microns, wherein a first maximum of the plurality of maxima is between 10 μm and 15 μm and a second maximum of the plurality of maxima is between 100 nm and 1 μm, and further wherein the iron disulfide particles include a naturally occurring iron disulfide source which accounts for the first maximum and a synthetic iron disulfide source which accounts for the second maximum, the naturally occurring iron disulfide source and the synthetic iron disulfide source provided at a ration of at least 2:1 on a volume basis.

2. The cathode according to claim 1, wherein the plurality of maxima includes at least three maxima.

3. The cathode according to claim 1, wherein the cathode material is coated onto a solid metal foil.

4. The cathode according to claim 3, wherein a thickness of the coated cathode material is between 5 and 30 times greater than the first maximum.

5. The cathode according to claim 3, wherein each maximum comprising the plurality of maxima, when considered on an individual basis, is less than one half of a thickness of the coated cathode material.

6. The cathode according to claim 3, wherein each maximum comprising the plurality of maxima, when considered on an individual basis, is less than one third of a thickness of the coated cathode material.

7. A cathode for a lithium iron disulfide electrochemical cell wherein two separate sources of pyrite are combined to have a plurality of maxima of mean diameters in a volume-based particle size distribution of all iron disulfide particles present in the cathode material and wherein one of said maxima is between 100 nanometers and 1 μm and one of said maxima is between 10 μm and 15 μm, wherein the first source of pyrite accounts for the maximum between 10 μm and 15 μm and the second source of pyrite accounts for the maximum between 100 nanometers and 1 μm, and further wherein the first source and the second source are provided at a ratio of at least 2:1 on a volume basis.

8. A cathode for a lithium iron disulfide electrochemical cell wherein two separate sources of pyrite are combined to have a plurality of maxima of mean diameters in a volume-based particle size distribution of all iron disulfide particles present in the cathode material and wherein a first maximum of the plurality of maxima is greater than 20 μm and a second maximum of the plurality of maxima is between 100 nm and 1 μm, wherein the first source accounts for the first maximum and the second source accounts for the second maximum, and further wherein the first source and the second source are provided at a ratio of at least 2:1 on a volume basis.

9. The cathode according to claim 8, wherein the first maximum is greater than 40 μm.

10. The cathode according to claim 8, wherein the first maximum is greater than 50 μm.

* * * * *